(12) United States Patent
Matsukawa

(10) Patent No.: US 9,353,712 B2
(45) Date of Patent: *May 31, 2016

(54) FUEL INTERFACE MODULES AND RELATED SYSTEMS AND METHODS

(71) Applicant: GO NATURAL CNG, LLC, Woods Cross, UT (US)

(72) Inventor: Matthew Matsukawa, Kaysville, UT (US)

(73) Assignee: Go Natural CNG, LLC, Woods Cross, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/642,336

(22) Filed: Mar. 9, 2015

(65) Prior Publication Data

US 2015/0240763 A1 Aug. 27, 2015

Related U.S. Application Data

(63) Continuation of application No. 13/104,856, filed on May 10, 2011, now Pat. No. 8,991,423.

(60) Provisional application No. 61/332,985, filed on May 10, 2010.

(51) Int. Cl.
*F16K 11/22* (2006.01)
*F02M 37/00* (2006.01)
(Continued)

(52) U.S. Cl.
CPC ......... *F02M 37/0023* (2013.01); *F02D 19/066* (2013.01); *F02D 19/0628* (2013.01); *F02D 19/0647* (2013.01); *F02D 19/0665* (2013.01); *F02D 19/0668* (2013.01); *F02D 19/0676* (2013.01); *F02D 19/0681* (2013.01); *F02M 21/0221* (2013.01); *F02M 21/0227* (2013.01); *F02M 21/0239* (2013.01);
(Continued)

(58) Field of Classification Search
CPC ........ F17C 13/08; F17C 13/002; F17C 13/00; F17C 5/06; F17C 5/02; F17C 5/007; F17C 5/00; B60K 2015/03315; B60K 2015/03026; B60K 2015/03019; B60K 15/03066
USPC .......... 123/457, 527; 180/69.5, 314; 137/605, 137/606, 602, 597, 557
See application file for complete search history.

(56) References Cited

U.S. PATENT DOCUMENTS

| 3,693,653 A | 9/1972 | Cramer et al. |
| 4,574,763 A * | 3/1986 | Hallberg ....................... 123/527 |

(Continued)

FOREIGN PATENT DOCUMENTS

| JP | 2000205050 | 7/2000 |
| WO | 2013086345 | 6/2013 |

(Continued)

*Primary Examiner* — Craig Schneider
*Assistant Examiner* — Angelisa L Hicks
(74) *Attorney, Agent, or Firm* — Kevin B. Laurence; Renaissance IP Law Group LLP

(57) ABSTRACT

Fuel interface modules that can be used in automotive vehicle fuel systems can include a body that defines a fuel channel and a plurality of ports through which fluid communication with the fuel channel can be established. Some modules include a check valve, a shutoff valve, and a coalescing filter assembly that are each coupled with a separate port. The fuel modules can be quickly installed and can eliminate many of the installing materials typically associated with automotive vehicle fuel systems.

30 Claims, 7 Drawing Sheets

(51) Int. Cl.
*F02M 21/02* (2006.01)
*F02D 19/06* (2006.01)

(52) U.S. Cl.
CPC .............. *Y02T 10/32* (2013.01); *Y02T 10/36* (2013.01); *Y10T 137/7837* (2015.04); *Y10T 137/8326* (2015.04); *Y10T 137/87249* (2015.04); *Y10T 137/87684* (2015.04)

(56) References Cited

U.S. PATENT DOCUMENTS

| | | | |
|---|---|---|---|
| 4,637,353 A | 1/1987 | Codrington | |
| 4,672,728 A * | 6/1987 | Nimberger | ............... 29/890.142 |
| 4,838,295 A | 6/1989 | Smith et al. | |
| 5,150,685 A | 9/1992 | Porter | |
| 5,150,690 A | 9/1992 | Carter | |
| 5,230,322 A | 7/1993 | Curran et al. | |
| 5,238,030 A | 8/1993 | Miller | |
| 5,303,733 A | 4/1994 | Nelson | |
| 5,408,957 A | 4/1995 | Crowley | |
| 5,408,967 A | 4/1995 | Foster | |
| 5,725,024 A | 3/1998 | Nimberger | |
| 5,775,309 A | 7/1998 | Burrahm | |
| 5,775,599 A | 7/1998 | Smith et al. | |
| 5,887,799 A | 3/1999 | Smith | |
| 6,000,427 A | 12/1999 | Hutton | |
| 6,041,762 A | 3/2000 | Sirosh et al. | |
| 6,050,246 A | 4/2000 | Abdelmesih | |
| 6,112,760 A | 9/2000 | Scott et al. | |
| 6,161,783 A | 12/2000 | Press | |
| 6,240,909 B1 | 6/2001 | Scott | |
| 6,250,261 B1 | 6/2001 | Santarossa | |
| 6,257,360 B1 | 7/2001 | Wozniak et al. | |
| 6,367,573 B1 | 4/2002 | Scott | |
| 6,412,588 B1 | 7/2002 | Scott et al. | |
| 6,484,699 B2 | 11/2002 | Paul | |
| 6,502,660 B1 | 1/2003 | Scott et al. | |
| 6,676,163 B2 | 1/2004 | Joitescu et al. | |
| 6,691,729 B2 | 2/2004 | Takeda et al. | |
| 6,883,540 B2 | 4/2005 | Bankstahl et al. | |
| 6,910,269 B2 | 6/2005 | BurkHart | |
| 7,124,959 B2 | 10/2006 | Baker et al. | |
| 7,162,994 B2 | 1/2007 | Li et al. | |
| 7,162,995 B2 | 1/2007 | Munshi | |
| 7,204,566 B2 | 4/2007 | Otomo et al. | |
| 7,213,564 B2 | 5/2007 | Hill et al. | |
| 7,222,836 B2 | 5/2007 | Chen | |
| 7,225,790 B2 | 6/2007 | Bartunek et al. | |
| 7,231,831 B1 | 6/2007 | Lancaster | |
| 7,281,514 B2 | 10/2007 | Hill et al. | |
| 7,281,515 B2 | 10/2007 | Mann et al. | |
| 7,293,418 B2 | 11/2007 | Noble et al. | |
| 7,302,939 B2 | 12/2007 | Hill et al. | |
| 7,308,889 B2 | 12/2007 | Post et al. | |
| 7,325,529 B2 | 2/2008 | Ancimer et al. | |
| 7,350,604 B2 | 4/2008 | Veenstra et al. | |
| 7,386,977 B2 | 6/2008 | Ancimer et al. | |
| 7,392,129 B2 | 6/2008 | Hill et al. | |
| 7,463,967 B2 | 12/2008 | Ancimer et al. | |
| 7,527,041 B2 | 5/2009 | Wing et al. | |
| 7,527,482 B2 | 5/2009 | Ursan et al. | |
| 7,542,842 B2 | 6/2009 | Hill et al. | |
| 7,546,744 B2 | 6/2009 | Harper et al. | |
| 7,591,257 B2 | 9/2009 | Bayer | |
| 7,607,898 B2 | 10/2009 | Noble et al. | |
| 7,627,416 B2 | 12/2009 | Batenburg et al. | |
| 7,793,688 B1 | 9/2010 | Gross et al. | |
| 7,837,054 B2 | 11/2010 | Van Oyen et al. | |
| 7,850,034 B2 | 12/2010 | Munshi et al. | |
| 7,905,469 B2 | 3/2011 | Nickels | |
| 8,028,676 B2 | 10/2011 | Ancimer et al. | |
| 8,091,536 B2 | 1/2012 | Munshi et al. | |
| 8,095,294 B1 | 1/2012 | Griffiths et al. | |
| 8,104,296 B2 | 1/2012 | Harper et al. | |
| 8,172,557 B2 | 5/2012 | Hilger et al. | |
| 8,215,331 B2 | 7/2012 | Chen | |
| 8,232,750 B2 | 7/2012 | Smugeresky et al. | |
| 8,322,357 B2 | 12/2012 | Chen | |
| 8,517,206 B2 | 8/2013 | Liu | |
| 8,534,403 B2 | 9/2013 | Pursifull | |
| D694,167 S | 11/2013 | Forsberg et al. | |
| D695,202 S | 12/2013 | Forsberg et al. | |
| 2002/0096212 A1 | 7/2002 | Yamada et al. | |
| 2003/0037487 A1 * | 2/2003 | Amendola et al. | ............ 141/234 |
| 2004/0075034 A1 | 4/2004 | Yokote | |
| 2006/0032532 A1 | 2/2006 | Suess et al. | |
| 2006/0163522 A1 | 7/2006 | Gallagher et al. | |
| 2008/0149078 A1 | 6/2008 | Hill et al. | |
| 2009/0050630 A1 | 2/2009 | Iida et al. | |
| 2010/0012097 A1 | 1/2010 | Jauss | |
| 2010/0078244 A1 | 4/2010 | Pursifull | |
| 2010/0294250 A1 | 11/2010 | Jauss | |
| 2011/0140483 A1 | 6/2011 | Veenstra | |
| 2011/0172871 A1 | 7/2011 | Hall et al. | |
| 2011/0206951 A1 | 8/2011 | Ford et al. | |
| 2011/0272045 A1 | 11/2011 | Matsukawa | |
| 2011/0276253 A1 | 11/2011 | Kjar et al. | |
| 2011/0288738 A1 | 11/2011 | Donnelly et al. | |
| 2012/0004824 A1 | 1/2012 | Milton et al. | |
| 2012/0012593 A1 | 1/2012 | Kurowa et al. | |
| 2012/0125294 A1 | 5/2012 | Trembath et al. | |
| 2013/0042836 A1 | 2/2013 | Trembath et al. | |
| 2013/0112171 A1 | 5/2013 | Matsukawa | |
| 2013/0187453 A1 | 7/2013 | Flett et al. | |
| 2013/0197777 A1 | 8/2013 | Sloan et al. | |
| 2013/0284748 A1 | 10/2013 | Sloan et al. | |
| 2013/0291825 A1 | 11/2013 | Sloan et al. | |
| 2013/0293163 A1 | 11/2013 | Flett | |
| 2013/0327782 A1 | 12/2013 | Davis | |
| 2014/0060494 A1 | 3/2014 | Milton et al. | |
| 2014/0061266 A1 | 3/2014 | Milton et al. | |
| 2014/0102415 A1 | 4/2014 | Wyban et al. | |

FOREIGN PATENT DOCUMENTS

| | | |
|---|---|---|
| WO | 2013142536 | 9/2013 |
| WO | 2013142729 | 9/2013 |

* cited by examiner

FUEL INTERFACE MODULES AND RELATED SYSTEMS AND METHODS

CROSS REFERENCE TO RELATED APPLICATIONS

This application claims the benefit under 35 U.S.C. §119(e) of U.S. Provisional patent application Ser. No. 13/104,856 titled FUEL INTERFACE MODULES AND RELATED SYSTEMS AND METHODS, which was filed on May 10, 2011. This application claims the benefit under 35 U.S.C. §119(e) of U.S. Provisional Patent Application No. 61/332,985, titled FUEL CONNECTOR INTERFACE FOR COMPRESSED NATURAL GAS CONVERSION KIT, which was filed on May 10, 2010. The entire contents of these applications are hereby incorporated by reference herein.

TECHNICAL FIELD

The present disclosure relates generally to fuel systems and relates more particularly to fuel connector devices and systems for pressurized gaseous fuels used in automotive vehicles.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
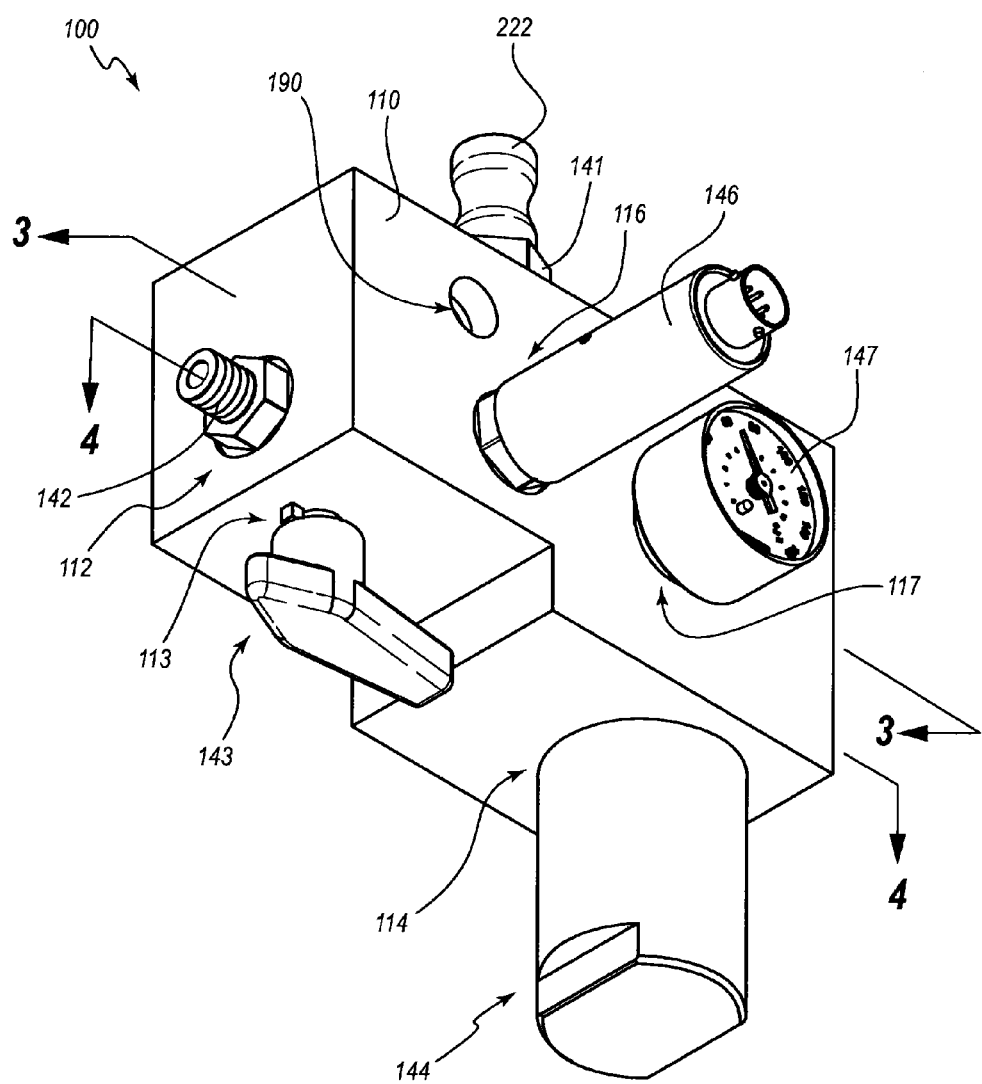
FIG. 1 is a perspective view of an embodiment of a fuel interface module coupled with various controlling and analyzing components.

Embodiments disclosed herein can be used in retrofitting an automotive vehicle (e.g., car, truck, or van) to operate on more than one fuel source. For example, the automotive vehicle may originally be configured to operate using a primary or original fuel source, such as a liquid source of fuel (e.g., gasoline or diesel fuel), in its internal combustion engine. Secondary fuel conversion kits can include added components that permit the vehicle to selectively use either the original fuel source or a secondary or alternative fuel source, such as a gaseous source of fuel (e.g., compressed natural gas, propane, or hydrogen fuel) in the internal combustion engine.

Secondary fuel conversion kits typically include a number of mechanical and electrical components that are used to control or direct the flow of fuel within a fuel system, such as to direct the fuel to a storage container or to deliver the fuel to the engine for combustion. A typical approach for installing an aftermarket secondary fuel system includes connecting each device used in managing or monitoring fuel within the system separately or one at a time into a high-pressure fuel line. Such fuel system components can include, for example, a secondary one-way check valve for a fueling inlet, a quarter-turn shutoff valve, a coalescing filter, a mechanical pressure gauge, and/or one or more electronic transducers for monitoring pressure and/or temperature. When added to the fuel system in this manner, each fuel system component can require a plurality of (e.g., two or three) unions or joints so as to attach the component into the fuel line. Every point of attachment to a link of stainless steel tubing, a custom high-pressure hose, or any other suitable high-pressure-fuel-line conduit can be a potential source of leakage from the fuel line. Additionally, the time required to make each attachment adds to the overall installation time of the system. Moreover, the system components may be mounted individually to the vehicle. For example, in some instances, each component may be attached separately at various positions along the frame rail and/or at other mounting positions. Such attachment procedures can require at least one mounting fastener (e.g., bolt) for each component, and the separately mounted components can consume a large amount of space. The time required for securing each mounting fastener in place adds to the overall installation time of the system. Consequently, known installation processes can be time consuming and labor intensive, can incur material costs for all tubing, hoses, and mounting hardware used, and can provide systems that occupy a large area and that have numerous potential leak points.

Certain embodiments can reduce or eliminate one or more of the shortcomings of traditional secondary fuel systems. For example, in some embodiments, a fuel interface module is provided that can fluidly connect multiple fuel system components to each other (see FIGS. 1 and 5). Embodiments of the fuel interface module can eliminate multiple connection points from a fuel line, can reduce the amount of fuel line materials used, can be installed quickly with relatively few mounting fasteners, and/or can be compact so as to occupy relatively little space when installed. Such features can be particularly desirable in aftermarket installations. One or more of the foregoing advantages and/or other or further advantages will be apparent from the present disclosure.

FIGS. 1-4 illustrate an embodiment of a fuel interface module 100, which may also be referred to as a fuel module or as a connector interface. The fuel interface module 100 can include a housing or body 110, which can define a series of orifices or ports 111, 112, 113, 114, 115, 116, 117, 118, 119. The body 110 can further define a fuel path or fuel channel 120 that provides flow communication, or fluid communication, among the ports 111, 112, 113, 114, 116, 117, 118, 119 and between the ports 114, 115, in the absence of any components being positioned in these ports. The term "fluid" is a broad term that is used herein in its ordinary sense, and includes within its scope gases and/or liquids. Terms such as "fluidly connect" and "fluid communication" are also broad terms used in their ordinary sense, and include within their scope situations where a fluid (i.e., a liquid or a gas) is capable of moving from one of the connected or communicating features to another, for example, along a generally defined path.

In the illustrated embodiment, the fuel channel 120 is formed of multiple interconnected branches 131, 132, 133, 134, 135. The body 110 can comprise any suitable material, which desirably can be capable of withstanding high pressures. The ports 111-119 and the fuel channel 120 can be formed in any suitable manner. For example, in some embodiments, the body 110 comprises a single block of aluminum, and the ports 111-119 and each of the branches 131-135 of the fuel channel 120 include machined channels or pass-through bores through the aluminum block. In other or further embodiments, at least portions of the body 110 and the channels 131-135 may be die cast or formed in any other suitable manner. In some embodiments, one or more of the ports 111-119 can be threaded to any suitable SAE or ISO standard, which can facilitate direct attachment of additional components to the body 110, as further discussed below. For example, in some embodiments, the ports 111-119 may comprise straight threading, and may be attached a component via an O-ring or other suitable seal. These or any other suitable connection interfaces are possible for the ports 111-119.

Figure 2:
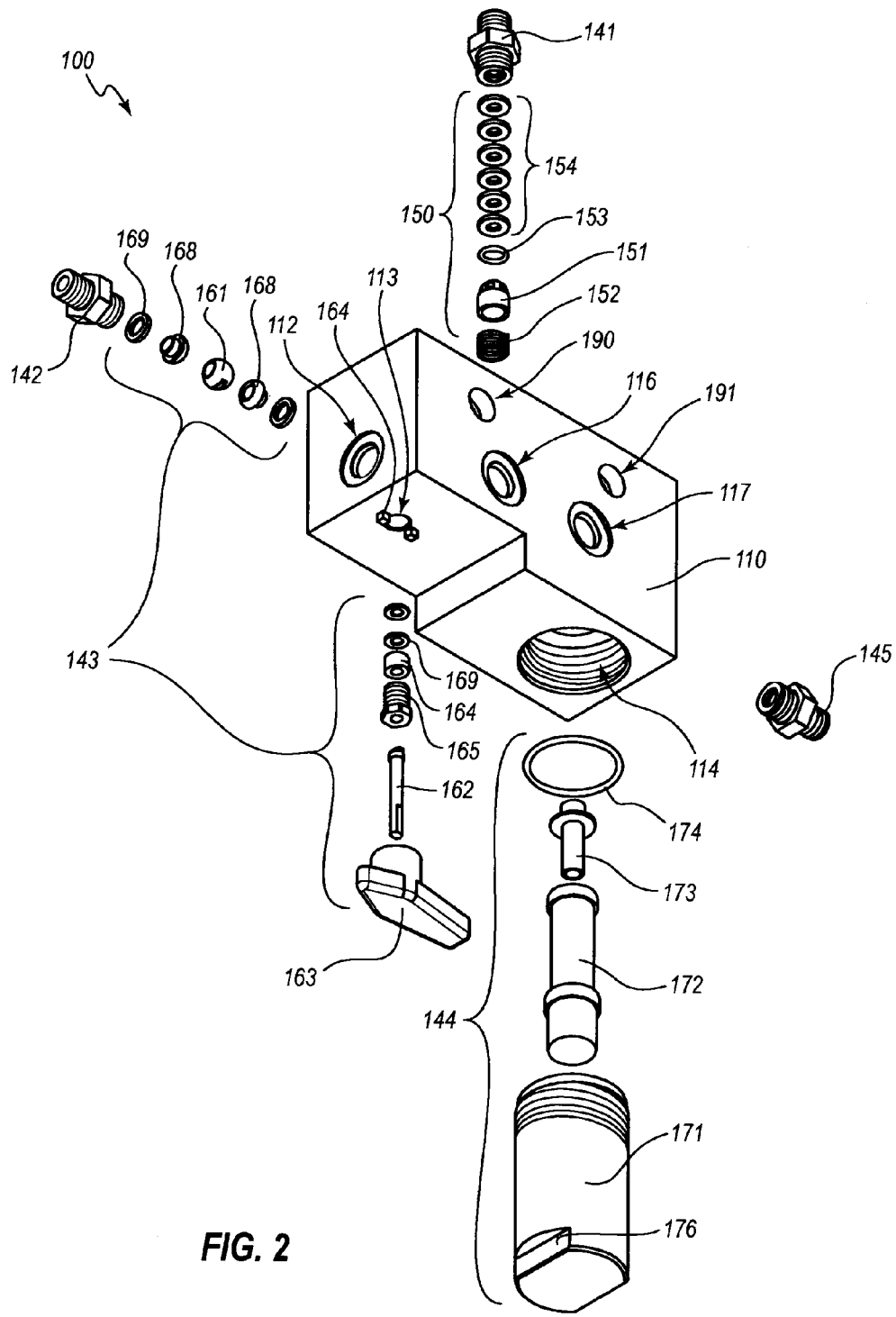
FIG. 2 is an exploded perspective view of the fuel interface module of FIG. 1.
Figure 3:
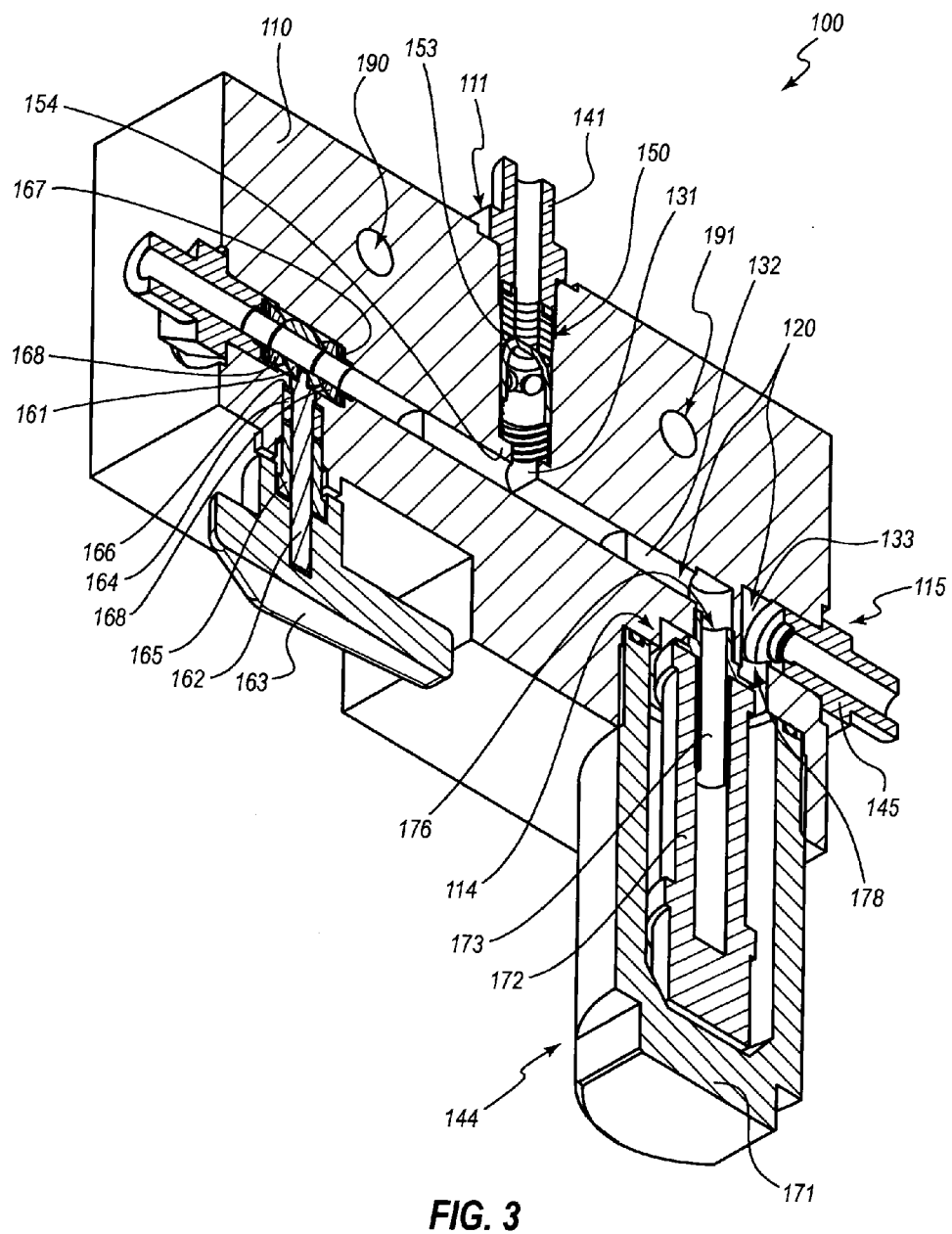
FIG. 3 is a cross-sectional perspective view of the fuel interface module of FIG. 1 taken along the view line 3-3 in FIG. 1.

As shown in FIGS. 2 and 3, an inlet port 111 can be configured to receive therein at least a portion of an inlet fitting 141. The inlet fitting 141 can be directly attached to the body 110 in any suitable manner, such as via complementary threading (e.g., straight threading), so as to form a high-pressure, gas-tight seal with body 110. In some embodiments, an O-ring (not shown) may be provided between the fitting 141 and the body 110 to assist in formation of the high-pressure, gas-tight seal, which is also true of other gas-tight seals discussed herein. The inlet fitting 141 can be rated for high-pressure applications, and thus may be termed a high-pressure fitting. Other fittings discussed herein may also be high-pressure fittings. As used herein, the term "direct," when used in conjunction with an attachment, connection, or coupling, refers to physical contact between components. Thus, although two components may be coupled with each other (e.g., fluidly coupled to each other) through one or more intermediate pieces, such as tubing, such components would not be directly coupled to each other where the intermediate pieces provide a physical separation between the components. On the other hand, the two components are directly coupled to each other when they are in direct physical contact with each other.

Figure 5:
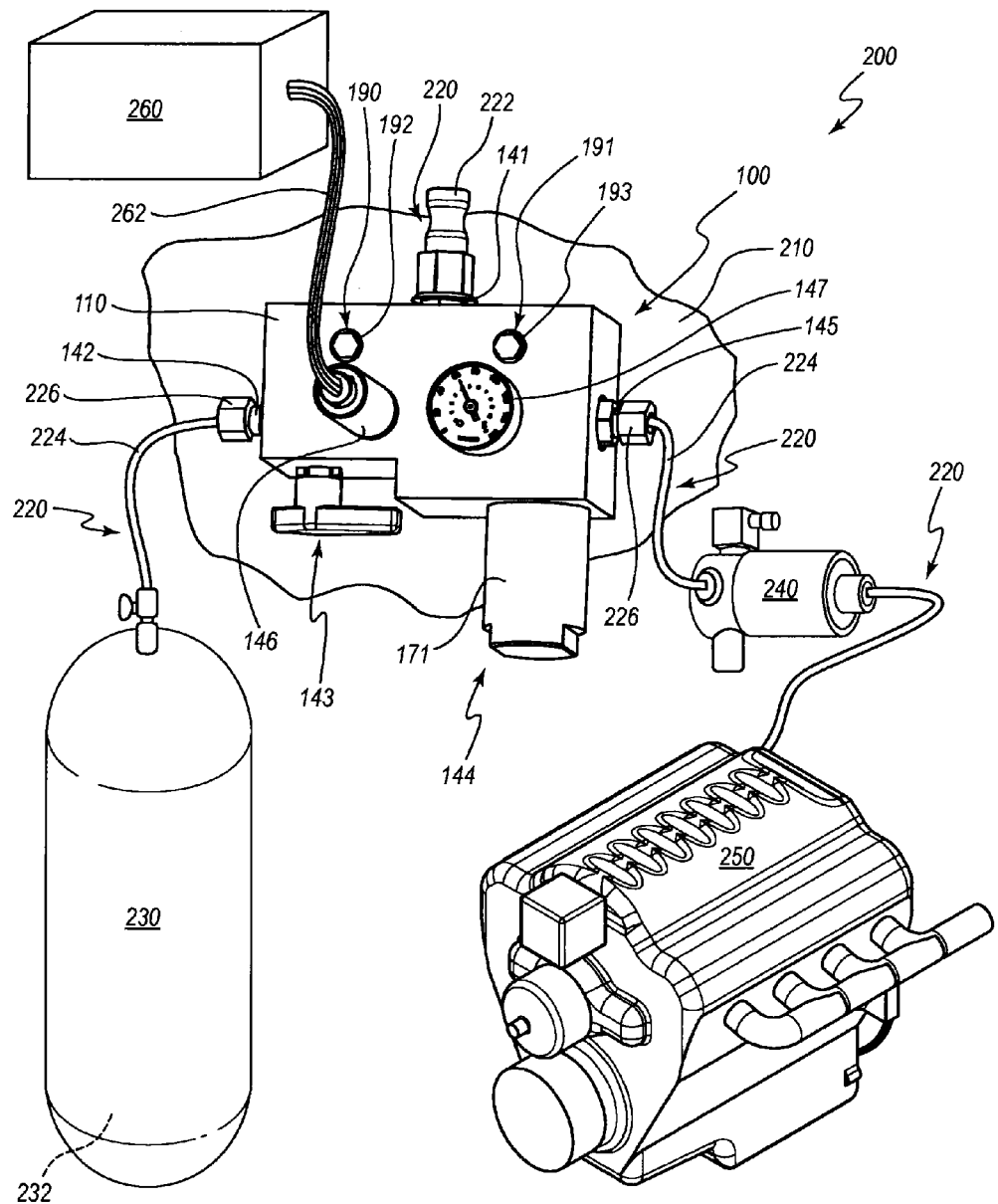
FIG. 5 is a perspective view of an embodiment of a fuel system that is compatible with the fuel interface module of FIG. 1.

As shown in FIG. 5, the inlet fitting 141 can be directly attached to a fuel line 220. In particular, the inlet fitting 141 can be attached to an inlet branch of the fuel line 220, which may include a primary inlet fueling nozzle 222. The primary inlet fueling nozzle 222 may include a one-way check valve and can be configured for selective attachment to the connector of a fueling compressor for purposes of refueling a fuel storage receptacle (e.g., a fuel cylinder or fuel tank 230—FIG. 5), as is known in the art. In the arrangement shown in FIG. 5, the fueling nozzle 222 is directly connected to the inlet fitting 141. In other embodiments, the fueling nozzle 222 may be connected to a length of stainless steel tubing or other fuel line material, which may be connected to the inlet fitting 141, as discussed further below.

With reference again to FIGS. 2 and 3, the inlet port 111 can further include therein a secondary one-way check valve 150. The one-way check valve 150 can act as a backup to the primary inlet fueling nozzle 222 during fueling or thereafter, and can ensure that fuel does not escape from a fuel system 200 (FIG. 5) via the inlet port 111. Stated otherwise, the one-way check valve 150 is configured to permit fuel to enter into the fuel channel 120 defined by the body 110, such as for purposes of providing fuel to a fuel storage receptacle (e.g., the fuel tank 230), but is configured to prevent fuel from exiting from the body 110 via the inlet port 111.

Any suitable arrangement is contemplated for the one-way check valve 150. In the illustrated embodiment, the one-way check valve 150 includes a valve body 151 that includes ports therein and a spring 152 that selectively seats the valve body 152 against a sealing member 153, such as an O-ring. A distal end of the spring 152 can seat against a shelf or rim 154 that is defined by the body 110. In the illustrated embodiment, one or more spacers or spacing washers 154 are used to provide a desired distance between the inlet fitting 141 and the valve body 152, which can ensure that a gas-tight seal is formed with the sealing member 153 and that the valve opens upon application thereto of a desired pressure. The a proximal washer 154 can abut against a distal end of the inlet fitting 141, and a distal washer 154 can abut against the sealing member 153. Other suitable arrangements of the one-way check valve 150 are also possible.

For example, in some embodiments, the piece that is identified as a valve body 151 in FIGS. 2 and 3 may instead act as a housing through which fuel can enter. The housing can include therein a separate fuel body, spring, and sealing member that act in the manner discussed above with respect to these like-named features. Additional spacing washers 154 may be positioned beneath the housing/valve body 151, as desired. Examples of suitable check valves and check valve components that can be used for the one-way check valve 150 are available from Kepner Products Company of Villa Park, Ill.

In certain embodiments, it can be desirable to position the check valve 150 within the body 110. Such an arrangement can be far more robust than traditional check valve assemblies that are directly attached to a high-pressure fuel line at either side thereof. For example, in the region of the fuel interface module 100 that includes the check valve 150, only one direct connection is made to a high-pressure fuel line (see FIG. 5), thus this sole connection is less susceptible to being torn apart or otherwise damaged. Moreover, the body 110 itself can be more resistant to damage than other check valve assemblies, such as from direct hit thereto, and can provide a greater amount of reinforcing material about the check valve 150.

With continued reference to FIGS. 2 and 3, a fuel storage port 112 can be configured to receive therein at least a portion of a fuel storage fitting 142. The fitting 142 can be directly attached to the body 110 in any suitable manner, such as via complementary threading, so as to form a high-pressure, gas-tight seal with the body 110. As further discussed below, the fuel storage fitting 142 can be coupled with a fuel storage receptacle, such as a fuel tank 230, via a branch of the fuel line 220 (see FIG. 5).

In the illustrated embodiment, both the fuel storage port 112 and a shutoff valve port 113 can be configured to receive components of an isolation valve or shutoff valve 143. Stated otherwise, at least a portion of the shutoff valve 143 can be built into the body 110. In the illustrated embodiment, the shutoff valve 143 comprises a quarter-turn ball valve. Other suitable valves are possible. The illustrated shutoff valve 143 includes a valve body 161 that is received within the fuel storage port 112. The valve body 161 defines a groove that receives a protrusion defined by a distal end of the shaft 162 so as to thereby connect to the shaft 162. The shaft 162 extends through the shutoff valve port 113 into this position. The shaft 162 is also connected to a handle 163 at its proximal end. The handle 163 is positioned at an exterior of the shutoff valve port 113. The valve body 161 thus can be rotated via rotation of the handle 163.

The valve body 161 can have a bore that extends therethrough. The valve body 161 can be compressed between two oppositely facing valve seats 168, each of which defines a concavity that is shaped and sized to receive a portion of the substantially spherical valve body 161. The valve seats 168 may be formed of any suitable material so as to form a seal with the valve body 161. For example, the valve seats 168 may comprise Teflon® and the valve body may comprise stainless steel. The valve seats 168 may be held in place via one or more spacers 169.

In various embodiments, the body 110 can define one or more stops 164 that are configured to limit rotation of the handle 163. For example, in the illustrated embodiment, the handle 163 can be turned so as to contact one of two stops 164, at which point the valve body 161 is in an open configuration that permits fuel to flow from the fuel channel 120 through the fuel storage fitting 142, or through the fuel storage fitting 142 into the fuel channel 120. The handle 163 can be turned one quarter turn (i.e., 90 degrees) so as to contact the other stop 164, at which point the valve body 161 is in a closed configuration so as to prevent fluid communication between the fuel channel 120 and the fuel storage fitting 142.

In the illustrated embodiment, a shutoff valve fitting 165 retains a sealing member 164 within the shutoff valve port 113, and each may be positioned about the shaft 162. The sealing member 164 may comprise Teflon® or any other suitable material. The shutoff valve fitting 165 can cooperate with the sealing member 164 to establish a high-pressure, gas-tight seal that prevents fuel from escaping from the body 110 via the shutoff valve port 113. The sealing member 164, or one or more spacing washers 169 associated therewith, can seat against a shelf or rim 166 of the body 110. Similarly, one or more components associated with the valve body 161, such as a spacing washer 169 and/or a valve seat 168, can abut a shelf portion defined by the body 110.

In certain embodiments, it can be desirable to position portions of the shutoff valve 143 within the body 110. Such an arrangement can be far more robust than traditional shutoff valve assemblies that are directly attached to a high-pressure fuel line at either side thereof. For example, in the region of the fuel interface module 100 that includes the shutoff valve 143, only one direct connection is made to a high-pressure fuel line (see FIG. 5), thus this sole connection is less susceptible to being torn apart or otherwise damaged. Moreover, the body 110 itself can be more resistant to damage than other shutoff valve assemblies, such as from direct hit thereto, and can provide a greater amount of reinforcing material about the various components of the shutoff valve 143.

With continued reference to FIGS. 2 and 3, a filter port 114 can be configured to couple with a filter assembly 144, such as by receiving therein at least a portion of a filter assembly 144. The filter assembly 144 can comprise any suitable filtering system. In the illustrated embodiment, the filter assembly 144 comprises a coalescing filter assembly, which can be particularly well-suited for filtering oil from compressed natural gas, for example. Accordingly, the filter assembly 144 may also be referred to as a coalescing filter assembly 144 herein.

In various embodiments, the coalescing filter assembly 144 can include a filter bowl 171, a filter element 172, and a nozzle 173. Any suitable coalescing filter assembly 144 may be used with the fuel interface module 100. The portion of the body 110 that defines the filter port 114 can have any suitable connection interface for coupling with the coalescing filter assembly 144. For example, the port 114 may be threaded so as to complementarily engage the filter bowl 171. The filter bowl 171 can cooperate with the body 110 to provide a high-pressure, gas-tight seal that prevents fuel from escaping from the body 110 at the filter port 114. In some embodiments, a sealing member 174, such as an O-ring, may assist in providing the high-pressure, gas-tight seal. The filter bowl 171 may comprise stainless steel or any other suitable material. In some embodiments, the filter bowl 171 may include flats 176 to assist in tightening or loosening of the filter bowl 171.

As can be seen in FIG. 3, the filter port 114 can include two openings into the fuel channel 120, each of which are defined by the body 110. In particular, the body 110 can define an opening 176 (also shown in FIG. 4) into the branch 132 of the fuel channel 120 that is sized to receive a distal end of the nozzle 173. Additionally, the body 110 can define an opening 178 into the branch 133 of the fuel channel 120. Unfiltered fuel thus can flow from the branch 132 of the fuel channel 120 through the opening 176 of the body 110 and through the nozzle 173 of the coalescing filter assembly 144 into the filter element 172. Fuel that has passed through the filter element 172 into the bowl 171 is diverted through the opening 178 of the body 110 into the branch 133 of the fuel channel 120. The coalescing filter assembly 144 thus can act as an extension of the fuel channel 120 that is defined by the body 110. Accordingly, when the coalescing filter assembly 144 is coupled with the body 110, it may be stated that the fuel channel 120 provides fluid communication among all of the ports 111-119. In certain embodiments, it can be desirable for the coalescing filter to be oriented vertically such that an open end of the bowl 171 faces upwardly and a closed end thereof faces downwardly.

With continued reference to FIG. 3, a fuel delivery port 115 can be configured to receive therein at least a portion of a fuel delivery fitting 145. The fitting 145 can be directly attached to the body 110 in any suitable manner, such as via complementary threading, so as to form a high-pressure, gas-tight seal with the body 110. As further discussed below, the fuel delivery fitting 145 can be coupled with any suitable devices within a fuel delivery branch of a fuel line 220, such as a pressure regulator 240 (see FIG. 5).

Figure 4:
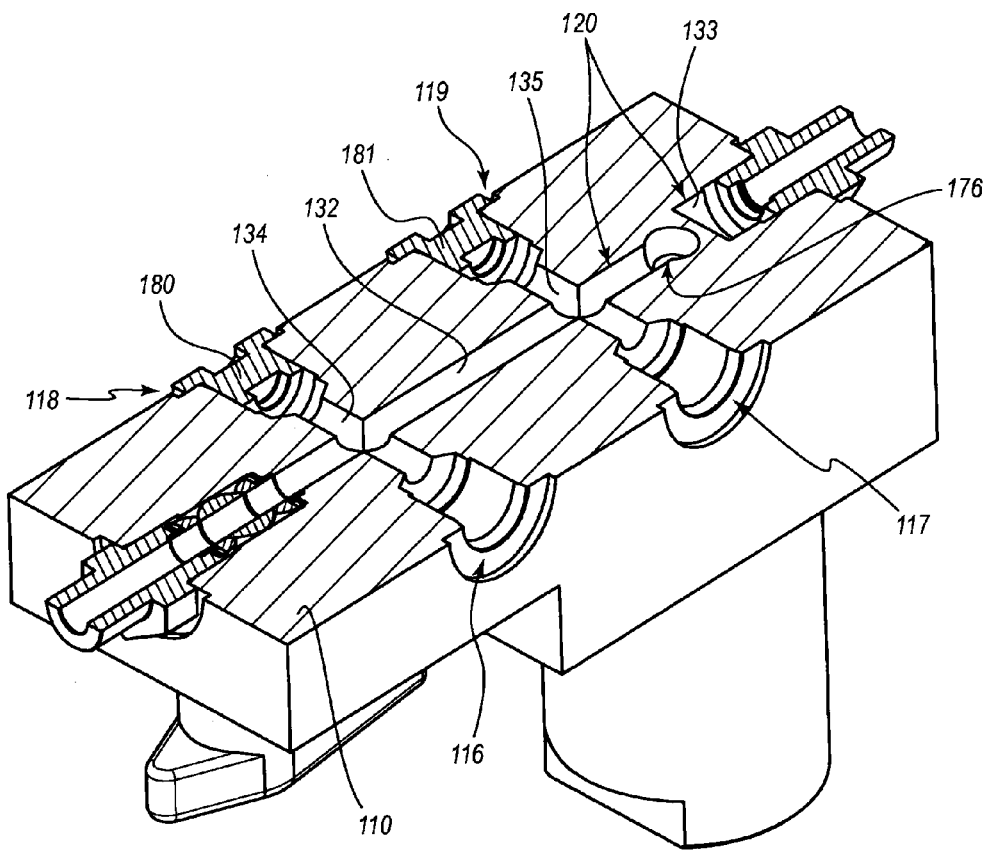
FIG. 4 is a cross-sectional perspective view of the fuel interface module of FIG. 1 taken along the view line 4-4 in FIG. 1.

FIG. 4 illustrates that analysis ports 116, 118 can be in fluid communication with the branches 134, 135 of the fuel channel 120, respectively. In the illustrated embodiment, an electronic transducer 146 is directly attached to the body 110 at the analysis port 116, and a mechanical or analogue pressure gauge 147 is directly attached to the body 110 at the analysis port 117, as shown in FIG. 1. In some embodiments, the pressure gauge 147 can include straight threading by which it can be attached to the analysis port 117, and may further include an O-ring or other seal to assist in establishing a gas-tight seal with the body 110. Similar attachments may also be made between electronic transducer 146 and the analysis port 116. In other embodiments, one or more of the electronic transducer 146 and the pressure gauge 147 can be indirectly attached to the body 110. For example, a fitting may be positioned between the electronic transducer 146 and the body 110 and/or between the pressure gauge 147 and the body.

The transducer 146 can be configured to provide electrical signals that are representative of one or more of the pressure and temperature within the channel 120. The transducer 146 may be attached by electrical wire to any number of electronic devices of a vehicle such as, for example, devices located in the cab of the vehicle to provide the driver of the vehicle with the measurement of pressure in the fuel tank, the fuel level, or the temperature of the fuel.

The pressure gauge 147 can be configured to provide an analogue readout of the pressure within the fuel channel 120. The manual pressure gauge 147 can provide a visual indication of the pressure in the fuel line. Thus, for example, a person working on a vehicle to which the fuel interface module 100 is installed might turn off the shutoff valve 143 and then turn the engine over to relieve the remaining pressure in the line and then visually check the pressure gauge 147 to ensure that the line is free of pressure prior to initiating repairs.

With further reference to FIG. 4, in the illustrated embodiment, each of the branches 134, 135 of the fuel channel 120 can be defined by a pass-through bore that extends through the body 110. Additional analysis ports 118, 119 may be formed opposite the analysis ports 116, 117, at the opposing ends of the branches 134, 135. In the illustrated embodiment, the ports 118, 119 are provided with plugs 180, 181, respectively. Each plug provides a high-pressure gas-tight seal with the body 110. In some embodiments, the plugs 180, 181 may occupy the analysis ports 116, 117, and the transducer 146 and the pressure gauge 147 can occupy the analysis ports 118, 119. Such reversibility of the ports analysis ports 116, 117 and the analysis ports 118, 119 may advantageously permit embodiments of the fuel interface module 100 to achieve a desired forward/rearward direction, regardless of the side of a vehicle to which the fuel interface module 100 is mounted. For example, whichever side of the fuel interface module 100 includes the plugs 180, 181 can be positioned toward or against mounting surface, such as a frame rail, and the transducer 146 and the pressure gauge 147 can extend away from the mounting surface.

With reference to FIGS. 2, 3 and 5, the body 110 can define one or more mounting channels 190, 191, which may be pass-through bores that extend through the body 110. With reference to FIG. 5, any suitable mounting fasteners 192, 193 can be inserted through the mounting channels 190, 191 so as to fix the fuel interface module 100 to an automotive vehicle. In the illustrated embodiment, the mounting fasteners 192, 193 are bolts, and the fuel interface module 100 is attached to a fuel rail 210 of the vehicle.

FIG. 5 illustrates a secondary fuel system 200 that is configured to operate with an internal combustion engine 250 of an automotive vehicle. As just discussed, the fuel interface module 100 can be attached to the vehicle in any suitable position and in any suitable manner. In some embodiments, it can be desirable for the fuel interface module 100 to be attached to an interior side of the fuel rail 210, which may serve as a barrier in the event of a collision. Moreover, in some arrangements, it may be desirable for the fuel delivery fitting 145 to face forwardly so as to be closer to the engine 250 and for the fuel storage fitting 142 to face rearwardly so as to be closer to the fuel canister or fuel tank 230. Such an arrangement can reduce an amount of fuel line material 224 that is used for the fuel line 220. The fuel line material 224 can be of any suitable variety, such as, for example, metal tubing, high-pressure tubing, or the like. Additionally, as previously noted, it may be desirable for the fuel interface module 100 to be oriented such that the closed end of the filter bowl 171 faces downwardly.

As previously mentioned, the inlet fitting 141 can be directly attached to the inlet fueling nozzle 222, as shown, so as to form high-pressure, gas-tight seal therewith. In other embodiments, the inlet fueling nozzle 222 can be spaced from the fuel interface module 100, for example, by several feet of fuel line material 224 (e.g., stainless steel tubing). The fueling nozzle 222 may be mounted at any suitable location that may be readily accessed by a user, such as within the fuel door cover or beneath the hood. In such instances, the inlet fitting 141 can be attached and sealed (e.g., via a high-pressure, gas-tight seal) to the fuel line material 224, either directly or via any suitable connector.

The fuel storage fitting 142 can be coupled with a fuel tank 230 via a length of fuel line material 224 that defines a fuel storage branch of the fuel line 220. For example, the storage fitting 142 may be directly attached and sealed to the fuel line material 224, or may be attached and sealed to the fuel line material 224 via any suitable connector 226. Similarly, the fuel delivery fitting 145 can be coupled with any suitable fuel delivery device, such as a pressure reducer or pressure regulator 240 and/or a fuel rail and fuel injectors (not shown) that are coupled with an intake manifold of the engine 250. The fuel delivery fitting 145 may be directly attached and sealed to a length of fuel line material 224 that defines at least a portion of a fuel delivery branch of the fuel line 220, or the fuel delivery fitting 145 may be attached and sealed to the fuel line material 224 via any suitable connector 226. As can be appreciated from the foregoing, the fuel interface module 100 is configured to be positioned within the high-pressure portion of the fuel line 220. Additionally, each position at which the fuel interface module 100 is connected to the fuel line 220 may be referred to as a connection point. Thus, in the illustrated embodiment, the fuel interface module 100 is connected to the fuel line 220 at three connection points, each of which provides a high-pressure, gas-tight seal. In various embodiments, the fuel interface module 100 can be configured for connection with a high-pressure fuel line 220 at no greater than two or no greater than three connection points, depending on the number of input and output ports it contains, which can depend, for example, on whether one or more of the valves 143, 150 are present.

The electronic transducer 146 can be electrically coupled with an electronic control module 260 or other suitable controller or processor via any suitable wiring 262. The fuel interface module 100 can be mounted such that the analogue pressure gauge 147 is readily viewable, such as, for example, when the vehicle is hoisted on an automotive lift.

It is noted that the coalescing filter assembly 144 may be used to remove oil from a gaseous fuel before the fuel goes into the pressure regulator 240 and/or injectors of the engine 250. Presence of oil in the gaseous fuel can foul the pressure regulator 240 and injectors of the engine 250, which could require that these relatively expensive components be replaced. A common reason that oil is found within a gaseous fuel such as natural gas for use in a vehicle is that fueling stations compress the gaseous fuel using reciprocating motors. The reciprocating motors typically run at relatively high speeds (e.g., about 1,000 rpm). These reciprocating motors usually include rings and oil within compressions chambers of the motor to reduce wear from friction induced by running at the relatively high speeds. As the rings wear, some oil may blow by the piston rings into the compression chamber, and this oil is introduced into to the gaseous fuel. The coalescing filter assembly 144 can remove this oil from the fuel.

With reference to FIGS. 1-5, illustrative methods of using the fuel interface module 100 will now be described. The shutoff valve 143 can be turned to an open configuration so as to provide fluid communication between the fuel channel 120 and the fuel storage fitting 142. The primary inlet fueling nozzle 222 can be coupled with a fuel source (not shown) and fuel can be introduced into the fuel channel 120 of the body 110. The fuel can progress through the open shutoff valve 143, through the fuel storage branch of the fuel line 220, and into the fuel storage tank 230. Fuel is represented by the reference numeral 232 in FIG. 5. During fueling, some of the fuel 232 may progress through the coalescing filter assembly 144 and down the fuel delivery branch of the fuel line 220, but may be stopped by pressure regulator 240 and/or ultimately the closed fuel injectors (not shown). During operation of the engine 250, fuel 232 can progress from the storage tank 230 into the fuel channel 120, can pass through the coalescing filter assembly 144, and can progress through the fuel delivery branch of the fuel line 220 so as to injected into the engine 250. The shutoff valve 143 can be closed when desired, such as when the primary fuel (e.g., gasoline) is used, when maintenance or repair is being performed on the vehicle, or in the event of a leak or accident.

As can be appreciated from the foregoing disclosure, multiple components can be in simultaneous fluid communication with fuel 232 that is within the fuel channel 120. For example, each of the secondary check valve 150, the shutoff valve 143, the coalescing filter assembly 144, the electronic transducer 146, and the analogue pressure gauge 147 can be in simultaneous fluid communication with fuel 232 that is within the fuel channel 120, and may simultaneously control or analyze the fuel 232. "Controlling" the fuel can include directing movement of the fuel and/or altering the fuel in some manner, such as by permitting or blocking passage of the fuel (e.g., via the check valve 150 or the shutoff valve 143) or by filtering the fuel (e.g., via the coalescing filter), and "analyzing" the fuel can include assessing, testing, probing, or testing the fuel (e.g., via the electronic transducer 146 or the pressure gauge 147). The five components just discussed, or any combination thereof, thus may be referred to herein as "fuel controlling or analyzing components."

It may also be stated that at least some fuel 232 can be permitted to flow between or among any combination of fuel controlling or analyzing components that are coupled to the body 110 without passing through any fittings, or without passing through any more than one, two, three, four, or five fittings. Stated otherwise, at least some fuel 232 can be permitted to flow between or among any combination of fuel controlling or analyzing components that are coupled to the body 110 without passing through any gas-tight seals, or without passing through any more than one, two, three, four, or five gas-tight seals. It may also be stated that at least some fuel 232 that is introduced into the fuel channel 120 can interact with (e.g., pass through, pass by, or directly contact) no fewer than one, two, three, four, or five fuel controlling or analyzing components before exiting the fuel channel 120. Stated otherwise, at least some fuel 232 that is permitted into the fuel channel 120 can interact with no fewer than one, two, three, four, or five fuel controlling or analyzing components before passing through no more than one, two, three, four, or five fittings or gas-tight seals. Stated in yet another manner, fuel that is permitted to enter the fuel interface module 100 through a fitting or a gas-tight seal can interact with no fewer than two fuel controlling or analyzing components without passing through any more than one additional fitting or gas-tight seal; can interact with no fewer than three fuel controlling or analyzing components without passing through any more than one or two additional fittings or gas-tight seals; can interact with no fewer than four fuel controlling or analyzing components without passing through any more than one, two, or three additional fittings or gas-tight seals; or can interact with no fewer than four fuel controlling or analyzing components without passing through any more than one, two, three, or four additional fittings or gas-tight seals.

As previously discussed, the body 110 can define the fuel channel 120, which can be devoid of fuel line conduit material, such as tubing or hoses. For example, the body 110 can be formed of a unitary piece of material and the channel 120 can be defined by bored out portions of the piece of material. Accordingly, it may also be stated that at least some fuel 232 can be permitted to flow between or among any combination of fuel controlling or analyzing components that are coupled to the body 110 without passing through any fuel line conduit material. It may also be stated that at least some fuel 232 that is introduced into the fuel interface module 100 can interact with (e.g., pass through, pass by, or directly contact) no fewer than one, two, three, four, or five fuel controlling or analyzing components without passing through any fuel line conduit material and/or without passing through any connection points at which the fuel interface module 100 is connected to the fuel line 220.

Illustrative examples of situations such as those just described are as follows. As previously discussed, fuel 232 can enter into the body 110 through the inlet fitting 141, and thus through the gas-tight seal by which the fitting 141 is joined to the body 110. Thereafter, the fuel 232 can progress through the one-way valve 150 into the fuel channel 120. Once within the fuel channel 120, a portion or portions of the fuel 232 can flow to the shutoff valve 144, where the fuel can then either be blocked by the valve body 161 or permitted to pass therethrough; can flow to the electronic transducer 146, where the fuel can contact a sensing portion thereof so that a property (e.g., pressure and/or temperature) of the fuel can be assessed thereby; can flow to the analogue pressure gauge 147, where the fuel can contact a sensing portion thereof so that the pressure of the fuel can be assessed thereby; and/or can flow to the coalescing filter assembly 144, where oil and/or other impurities in the fuel can be removed. As previously discussed, fuel 232 that has passed through the shutoff valve 144 can proceed through the fuel storage fitting 142, and thus likewise can proceed through the gas-tight seal by which the fitting 142 is joined to the body 110. It is also noted that after fuel 232 has passed through the coalescing filter assembly 144, the fuel 232 can exit the fuel channel 120 through the fuel delivery fitting 145, and thus through the gas-tight seal by which the fitting 145 is joined to the body 110.

Similarly, as previously discussed, fuel 232 can enter into the body 110 from the fuel tank 230 through the fuel storage fitting 142. Thereafter, the fuel 232 can progress through the shutoff valve 143 into the fuel channel 120. Once within the fuel channel 120, a portion or portions of the fuel 232 can flow to the one-way valve 150, where the fuel can be blocked by the valve body 151; can flow to the electronic transducer 146, where the fuel can contact a sensing portion thereof so that a property (e.g., pressure and/or temperature) of the fuel can be assessed thereby; can flow to the analogue pressure gauge 147, where the fuel can contact a sensing portion thereof so that the pressure of the fuel can be assessed thereby; and/or can flow to the coalescing filter assembly 144, where oil and/or other impurities in the fuel can be removed.

As previously discussed, the fuel interface module 100 can be configured to withstand high pressures without leaking, and moreover, can provide a limited number of connection points to the fuel line 220 at which leaking would even be a possibility. In certain embodiments, the fuel interface module 100 can be configured to withstand pressures typically associated with compressed natural gas, such as pressures of up to about 3,000, 3,600, 4,000, or 5,000 psi. In some embodiments, the fuel interface module 100 can be configured to withstand much greater pressures without failing, such as up to about 10,000, 15,000, 20,000, 25,000, or 30,000 psi.

As previously discussed, attaching the fuel interface module 100 to a vehicle can greatly reduce installation times, since multiple components can be attached to the vehicle simply by attaching the body 110 to the vehicle. It may be stated that two or more, three or more, four or more, or five or more fuel controlling and analyzing components can be attached to the vehicle simultaneously by attaching the body 110 to the vehicle. For example, the controlling components (the check valve 150, the shutoff valve 143, and the coalescing filter assembly 144) can be simultaneously attached to the vehicle in this manner. Moreover, where the electronic transducer 146 and/or the pressure gauge 147 are attached to the body 110 prior to installation of the fuel interface module 100, these analyzing components also can be simultaneously attached to the vehicle along with the check valve 150, the shutoff valve 143, and the coalescing filter assembly 144.

Figure 6:
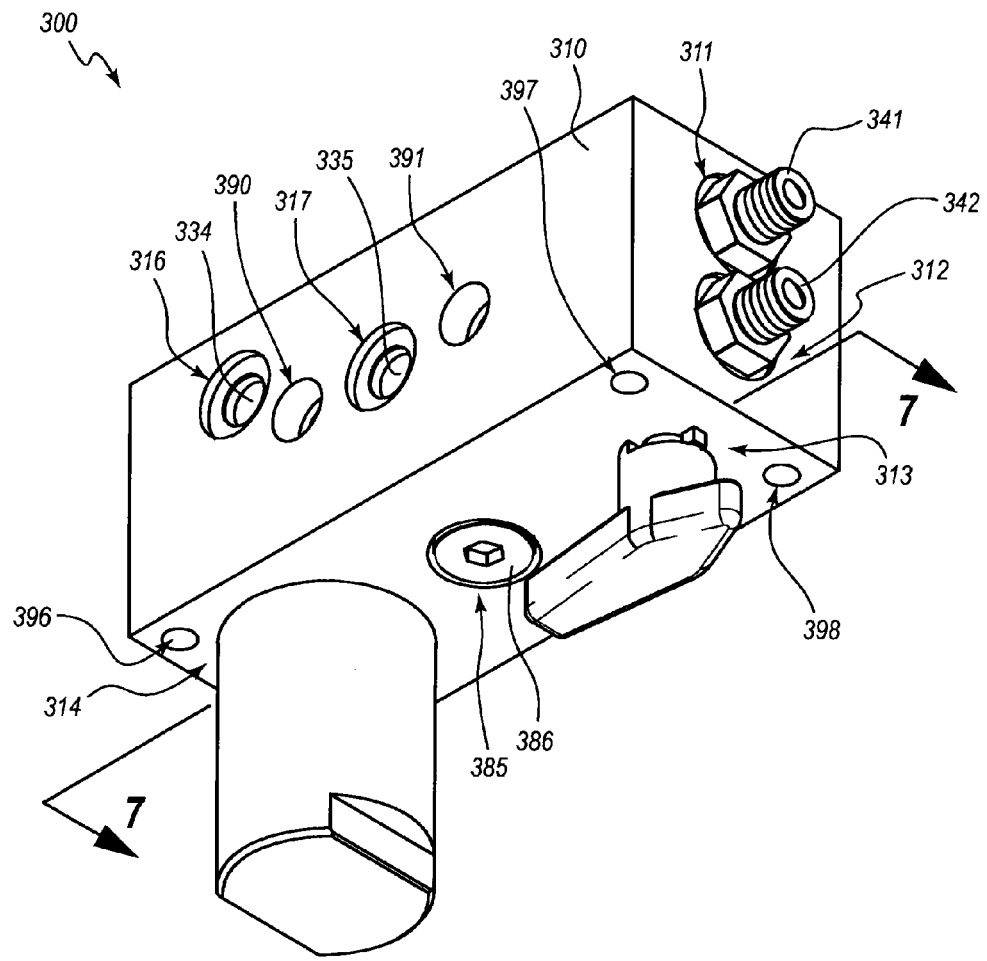
FIG. 6 is a perspective view of another embodiment of a fuel interface module.
Figure 7:
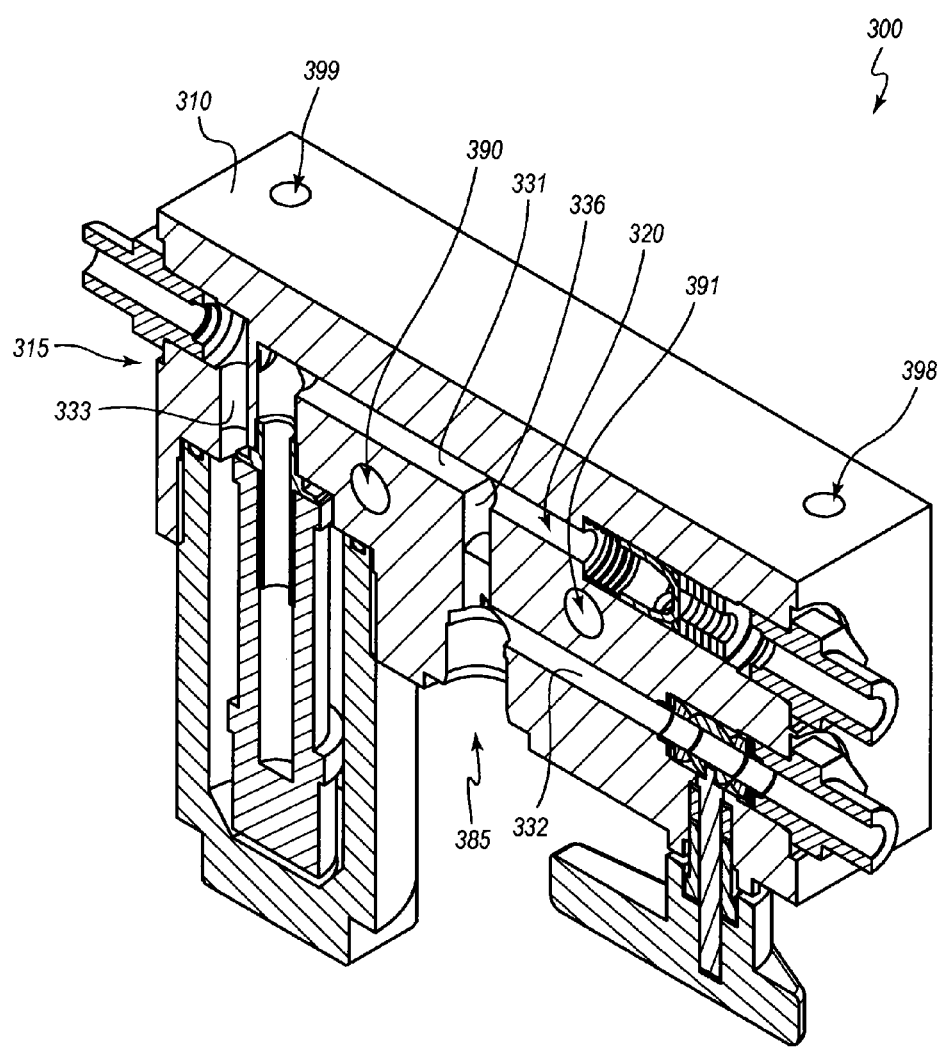
FIG. 7 is a cross-sectional perspective view of the fuel interface module of FIG. 6.

FIGS. 6 and 7 illustrate another embodiment of a fuel interface module 300. The fuel interface module 300, and components thereof, can resemble the fuel interface module 100, and components thereof, described above in certain respects. Accordingly, like features are designated with like reference numerals, with the leading digits incremented to "3." Relevant disclosure set forth above regarding similarly identified features thus may not be repeated hereafter. Moreover, specific features of the fuel interface module 300 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the fuel interface module 300. Any suitable combination of the features and variations of the same described with respect to the fuel interface module 100 can be employed with the fuel interface module 300, and vice versa.

As with the fuel interface module 100 discussed above, the fuel interface module 300 can be configured for use in a fuel line between a pressure regulator, a fuel tank, and a fuel fill nozzle. As discussed hereafter, the fuel interface module 300 an include a housing having a plurality of orifices, first, second and third fittings mounted to the housing, a one-way check valve mounted to the housing, a filter assembly mounted to the housing, and an adjustable valve mounted to the housing. The filter assembly may include a filter bowl and a coalescing filter. The adjustable valve may be a quarter turn valve that is operable to control flow through the second fitting. The first, second and third fittings may be high-pressure rated fittings. At least two of the orifices of the housing may be configured as pass-through bores through the housing.

The fuel interface module 300 can include a housing or body 310, which can define a series of orifices or ports 311, 312, 313, 314, 315, 316, 317, 385. The body 310 can further define a fuel path or fuel channel 320 that provides fluid communication among the ports 311-317. In the illustrated embodiment, the fuel channel 320 is formed of multiple interconnected branches 331, 332, 333, 334, 335, 336. A cross-over branch 336 can extend vertically so as to join an upper branch 331 to a lower branch 332. The cross-over branch 336 may be formed in any suitable manner. In the illustrated embodiment, the cross-over branch 336 is formed by machining a bore through the bottom face of the body 310. Further machining may yield the lower port 385, which can either be sealed with a plug 386 or occupied by any desired controlling or analyzing component.

The port 311 can be a fuel inlet port, such as the fuel inlet port 111 discussed above, and can be coupled with a fuel inlet fitting 341. Similarly, the port 312 can be a fuel storage port, such as the fuel storage port 112 discussed above, and can be coupled with a fuel storage fitting 342. The fittings 341, 342 can be positioned at the same side of the body 310 (e.g., a rearward side, as determined from an orientation of the fuel interface module 300 when it is coupled with a vehicle). Accordingly, an upper side of the body 310 can be devoid of ports.

The body 310 can define a plurality of mounting channels 396, 397, 398, 399 that extend from the upper face toward the lower face of the body 310. In some embodiments, the mounting channels 396, 397, 398, 399 extend only a small distance through the body 310, whereas in other embodiments (such as the illustrated embodiment), the mounting channels may extend through the lower face of the body 310. Additionally, the body 310 can define a plurality of mounting channels 390, 391 that extend between the two side faces of the body 310 in a manner such as the mounting channels 190, 191 discussed above. Any suitable mounting hardware or mounting fasteners can be positioned in any of the mounting channels 390, 391, 396, 397, 398, 399, or in any suitable combination thereof, so as to mount the fuel interface module 300 to a vehicle. Such an arrangement can provide for a greater number of mounting options for the fuel interface module 300 and/or can provide for a more secure attachment of the fuel interface module 300 to a vehicle. For example, a side face of the body 310 can be positioned against a frame rail or other suitable structure of an automotive vehicle, or that is mounted to the vehicle (e.g., a mounting bracket), and the body 310 can be secured thereto. In other or further instances, the upper face of the body 310 can be positioned against any suitable structure of the vehicle, or any suitable structure that is mounted to the vehicle, and the body 310 can be secured thereto.

Embodiments of the fuel interface module 300 can also be more compact than the illustrated fuel interface module 100, and thus may be better suited for certain applications that have more limited space. For example, in some instances, the illustrated fuel interface module 100 may be used with trucks, whereas the illustrated fuel interface module 300 may be used with cars.

Embodiments of the fuel interface modules 100, 300 may include more or fewer features than those depicted in the drawings. For example, some embodiments may not include one or more of a check valve 150, a shutoff valve 143, coalescing filter assembly 144, a pressure transducer 146, and a pressure gauge 147. The fuel interface modules 100, 300 may thus include fewer ports. In those embodiments that do not include a filter port 114, the fuel channel 120 can fluidly connect all of the ports that are defined by the body 110 (i.e., a coalescing filter assembly 144 is not used to form a branch of the fuel channel 120). In other embodiments, the fuel interface modules 100, 300 may include more ports for use with additional controlling or analyzing components. The bodies 110, 310 may define more or fewer mounting channels.

In certain embodiments, a fuel interface module 100 (or 300) can be provided as part of a kit. The kit can include a body 110 (or 310), and can further include one or more of a check valve 150, a fuel inlet fitting 141 (or 341), a fuel storage fitting 142 (or 342), a shutoff valve 143, a coalescing filter assembly 144, a fuel delivery fitting 145, an electronic transducer 146, an analogue pressure gauge 147, and one or more plugs 180, 181, 386, each of which may be provided separately from the body 110 (or 310) or which may be preassembled therein. The kit may further include mounting hardware (e.g., mounting fasteners), a fueling nozzle 222, and/or one or more connectors and/or lengths of fuel line material, such as tubing and/or hoses.

Although much of the foregoing disclosure is discussed in the context of retrofitting a vehicle with a secondary fuel system, it should be appreciated that embodiments may be used as original features of a factory-produced vehicle. For example, the fuel system 200 may be used as a primary fuel system, rather than as a secondary fuel system. Any suitable use of the apparatus, assemblies, systems, and methods discussed herein is contemplated.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of one or more of the terms "about," "approximately," "substantially," and "generally." For each such reference, it is to be understood that, in some embodiments, the value, feature, or characteristic may be specified without approximation. For example, where such a qualifier is used, the terms includes within its scope the qualified word in the absence of the qualifier.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment. Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the preceding claims up to and including claim [x]," where the bracketed term "[x]" is replaced with the number of the most recently recited independent claim. For example, for the first claim set that begins with independent claim 1, claim 3 can depend from either of claims 1 and 2, with these separate dependencies yielding two distinct embodiments; claim 4 can depend from any one of claim 1, 2, or 3, with these separate dependencies yielding three distinct embodiments; and so on.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." Recitation in the claims of the term "first" with respect to a feature or element does not necessarily imply the existence of a second or additional such feature or element. Elements specifically recited in means-plus-function format, if any, are intended to be construed in accordance with 35 U.S.C. §112 ¶ 6. Embodiments of the invention in which an exclusive property or privilege is claimed are defined as follows.

The invention claimed is:

1. A fuel interface module comprising:
a single, non-separable body comprising a single, unitary material, wherein the body comprises a fuel inlet port, a fuel storage port, a fuel outlet port, and a fuel channel at an interior of the body that connects each port to the other ports;
a check valve directly coupled with the fuel inlet port, wherein the check valve is configured to permit a gaseous fuel to be introduced into the fuel channel via the fuel inlet port and is configured to prevent the gaseous fuel from exiting the fuel channel via the fuel inlet port; and
a shutoff valve directly coupled with the body, wherein the shutoff valve is configured to transition between an open orientation and a closed orientation, wherein when the shutoff valve is in the open orientation, it is configured to permit a gaseous fuel to flow from the fuel channel through the fuel storage port so as to fill a fuel tank or to permit a gaseous fuel from a fuel tank to flow through the fuel storage port into the fuel channel for subsequent delivery to a pressure regulator, and wherein when the shutoff valve is in the closed orientation, it is configured to prevent a gaseous fuel from flowing through the fuel storage port;
wherein the fuel storage port is configured to be indirectly coupled with a fuel tank such that an entirety of the fuel interface module is spaced from the fuel tank and is at an exterior of the fuel tank when the fuel storage port is in fluid communication with the fuel tank.

2. The fuel interface module of claim 1, wherein the fuel interface module is configured to permit gaseous fuel to flow within the fuel channel, without passing through any fittings, between or among a plurality of fuel controlling or analyzing components including the check valve and the shutoff valve.

3. The fuel interface module of claim 1, wherein at least a portion of the fuel channel is defined by a bore that extends through at least a portion of the body.

4. The fuel interface module of claim 3, wherein the bore extends through opposing sides of the body and a port is positioned at each end of the bore, wherein each port is configured to be coupled with either of a plug and a controlling or analyzing component, and wherein the plug that seals an end of the bore can be moved to an opposite end of the bore such that the fuel interface module is reversible.

5. The fuel interface module of claim 1, further comprising a filter port and a coalescing filter assembly directly coupled with the filter port, wherein the coalescing filter assembly is positioned and configured to filter oil from a gaseous fuel that is received into the fuel channel.

6. The fuel interface module of claim 5, wherein the coalescing filter assembly comprises a bowl coupled directly to the body.

7. The fuel interface module of claim 6, wherein the coalescing filter assembly further comprises a nozzle coupled with the body and a filter element positioned between the nozzle and the bowl.

8. The fuel interface module of claim 1, wherein at least a portion of the check valve is at an interior of the body.

9. The fuel interface module of claim 1, wherein the shutoff valve comprises a handle that is accessible at an exterior of the body so as to permit manipulation of portions of the valve that are positioned at an interior of the body.

10. The fuel interface module of claim 9, wherein the body defines one or more stops that are configured to cooperate with the handle to restrict movement of the shutoff valve between the open orientation and the closed orientation.

11. A fuel interface module for indirect coupling with a fuel tank and for indirect coupling with a pressure regulator, the fuel interface module comprising:

a single, non-separable body comprising a single, unitary material, the body comprising a fuel inlet port, a fuel storage port, a filter port, a fuel outlet port, and a fuel channel that connects each port to the other ports, wherein the fuel channel comprises a longitudinal section between a first end of the body and a second end of the body, wherein the fuel channel comprises branches extending from the longitudinal section;

a check valve directly coupled with the fuel inlet port, wherein the check valve is configured to permit a gaseous fuel to be introduced into the fuel channel via the fuel inlet port and is configured to prevent the gaseous fuel from exiting the fuel channel via the fuel inlet port;

a shutoff valve directly coupled with the body, wherein the shutoff valve is configured to transition between an open orientation and a closed orientation, wherein when the shutoff valve is in the open orientation, it is configured to permit a gaseous fuel to flow from the fuel channel through the fuel storage port so as to fill a fuel tank or to permit a gaseous fuel from a fuel tank to flow through the fuel storage port into the fuel channel for subsequent delivery to a pressure regulator, and wherein when the shutoff valve is in the closed orientation, it is configured to prevent a gaseous fuel from flowing through the fuel storage port; and a coalescing filter assembly directly coupled with the filter port, wherein the coalescing filter assembly is configured to filter oil from a gaseous fuel that is received into the fuel channel;

wherein the fuel storage port is at the first end of the body and the fuel delivery port is at the second end of the body, wherein the longitudinal section of the fuel channel extends through the body between the fuel storage port and the fuel delivery port; and wherein the fuel interface module is configured such that gaseous fuel enters the body via the fuel storage port, travels through the body via the fuel channel without leaving the fuel channel other than passing through the coalescing filter assembly, and exits via the fuel delivery port.

12. The fuel interface module of claim 11, wherein the fuel storage port is configured to be indirectly coupled with a fuel tank such that an entirety of the fuel interface module is spaced from the fuel tank and is at an exterior of the fuel tank when the fuel storage port is in fluid communication with the fuel tank.

13. The fuel interface module of claim 11, wherein the fuel interface module is configured to permit gaseous fuel to flow within the fuel channel, without passing through any fittings, between or among a plurality of fuel controlling or analyzing components including the check valve, the shutoff valve, and the coalescing filter assembly.

14. The fuel interface module of claim 11, wherein the filter port and the coalescing filter assembly are spaced from the fuel storage port such that after fuel enters the body via the fuel storage fitting, the fuel passes through the shutoff valve prior to passing through the coalescing filter assembly.

15. The fuel interface module of claim 11, wherein each port is positioned at an end of one of the branches or an end of the longitudinal section.

16. The fuel interface module of claim 11, wherein each branch of the fuel channel extends transversely through at least a portion of the body.

17. The fuel interface module of claim 11, wherein each branch extends through opposing sides of the body and each port is positioned at an end of the branches, wherein each port is configured to be coupled with either of a plug and a controlling or analyzing component, and wherein the plug that seals an end of the branch can be moved to an opposite end of the branch such that the fuel interface module is reversible.

18. A fuel interface module for indirect coupling with a fuel tank and for indirect coupling with a pressure regulator, the fuel interface module comprising:

a body that comprises a fuel inlet port, a fuel storage port, a filter port, a fuel outlet port, and a fuel channel that connects each port to the other ports;

a check valve directly coupled with the fuel inlet port, wherein the check valve permits a gaseous fuel to be introduced into the fuel channel via the fuel inlet port and prevents a gaseous fuel from exiting the fuel channel via the fuel inlet port;

a shutoff valve directly coupled with the body, wherein the shutoff valve transitions between an open orientation and a closed orientation, wherein when the shutoff valve is in the open orientation a gaseous fuel is permitted to flow from the fuel channel through the fuel storage port so as to fill a fuel tank or a gaseous fuel is permitted to flow from a fuel tank through the fuel storage port into the fuel channel for subsequent delivery to a pressure regulator, and wherein when the shutoff valve is in the closed orientation a gaseous fuel is prevented from flowing through the fuel storage port;

a coalescing filter assembly directly coupled with the filter port, wherein the coalescing filter assembly filters oil from a gaseous fuel passing through the fuel channel;

a fuel storage fitting directly coupled with the fuel storage port, wherein the fuel storage fitting is configured to be directly coupled with a first portion of a fuel line that is coupled a fuel tank such that an entirety of the fuel interface module is spaced from the fuel tank and is at an exterior of the fuel tank when the fuel storage port is in fluid communication with the fuel tank; and a fuel delivery fitting directly coupled with the fuel delivery port, wherein the fuel delivery fitting is configured to be directly coupled with a second portion of a fuel line that is coupled with a pressure regulator when the fuel delivery port is in fluid communication with the pressure regulator; and wherein the fuel interface module permits fluid communication from a fuel tank to a pressure regulator when the fuel storage fitting is coupled with a first portion of a fuel line, when the fuel delivery fitting is coupled with a second portion of a fuel line, and when the shutoff valve is in the open orientation;

wherein, when the fuel interface module is in use to provide fluid communication from a fuel tank to a pressure regulator, the configuration of the fuel interface module permits gaseous fuel to enter the fuel interface module via the fuel storage fitting, then to travel through the body via the fuel channel without leaving the fuel channel other than passing through the coalescing filter assembly, and then to exit the fuel interface module via the fuel delivery fitting; and wherein, when the fuel interface module is in use to provide fluid communication from a fuel tank to a pressure regulator, the configuration of the fuel interface module permits fuel to enter and exit the fuel interface module without passing through any fittings other than the fuel storage fitting and the fuel delivery fitting, and the configuration of the fuel interface module permits fuel to move through the fuel interface module between fuel storage fitting and the fuel delivery fitting via the fuel channel such that movement of the fuel is obstructed in the fuel channel only by the coalescing filter assembly.

19. The fuel interface module of claim 18, wherein the fuel interface module is configured to permit gaseous fuel to flow within the fuel channel, without passing through any fittings, between or among a plurality of fuel controlling or analyzing components including the check valve, the shutoff valve, and the coalescing filter assembly.

20. The fuel interface module of claim 18, wherein the filter port and the coalescing filter assembly are spaced from the fuel storage port such that after fuel enters the body via the fuel storage fitting, the fuel passes through the shutoff valve prior to passing through the coalescing filter assembly.

21. The fuel interface module of claim 18, wherein the fuel channel comprises a longitudinal section between a first end of the body and a second end of the body, wherein the fuel channel comprises branches extending from the longitudinal section.

22. The fuel interface module of claim 21, wherein each port is positioned at an end of one of the branches or an end of the longitudinal section.

23. The fuel interface module of claim 21, wherein each branch of the fuel channel extends transversely through at least a portion of the body.

24. The fuel interface module of claim 21, wherein each branch extends through opposing sides of the body and each port is positioned at an end of one of the branches, wherein each port is configured to be coupled with either of a plug and a controlling or analyzing component, and wherein the plug that seals an end of the branch can be moved to an opposite end of the branch such that the fuel interface module is reversible.

25. A system comprising:
a fuel tank;
a pressure regulator;
a fuel interface module, wherein the fuel interface module is indirectly coupled to the fuel tank via a first portion of a fuel line, wherein the fuel interface module is indirectly coupled to the pressure regulator via a second portion of a fuel line, wherein the fuel interface module comprises:
  a body that comprises a fuel inlet port, a fuel storage port, a fuel outlet port, and a fuel channel that connects each port to the other ports;
  a check valve directly coupled with the fuel inlet port, wherein the check valve permits a gaseous fuel to be introduced into the fuel channel via the fuel inlet port and prevents a gaseous fuel from exiting the fuel channel via the fuel inlet port;
  a shutoff valve directly coupled with the body, wherein the shutoff valve transitions between an open orientation and a closed orientation, wherein when the shutoff valve is in the open orientation a gaseous fuel is permitted to flow from the fuel channel through the fuel storage port so as to fill the fuel tank or a gaseous fuel is permitted to flow from the fuel tank through the fuel storage port into the fuel channel for subsequent delivery to the pressure regulator, and wherein when the shutoff valve is in the closed orientation a gaseous fuel is prevented from flowing through the fuel storage port; a coalescing filter assembly directly coupled with the filter port, wherein the coalescing filter assembly filters oil from the gaseous fuel passing through the fuel channel;
  a fuel storage fitting directly coupled with the fuel storage port, wherein the fuel storage fitting is directly coupled with the first portion of the fuel line such that the fuel interface module is indirectly coupled with the fuel tank via the first portion of the fuel line; and
  a fuel delivery fitting directly coupled with the fuel delivery port, wherein the fuel delivery fitting is directly coupled with the second portion of the fuel line such that the fuel interface module is indirectly coupled with the pressure regulator via the second portion of the fuel line;
  wherein the fuel interface module provides fluid communication from the fuel tank to a pressure regulator when the shutoff valve is in the open orientation;
  wherein, when the fuel interface module is in use to provide fluid communication from a fuel tank to a pressure regulator, the configuration of the fuel interface module permits fuel to enter the fuel interface module via the fuel storage fitting, then to travel through the fuel interface module via the fuel channel, and then to exit the fuel interface module via the fuel delivery fitting; and
  wherein, when the fuel interface module is in use to provide fluid communication from a fuel tank to a pressure regulator, the configuration of the fuel interface module permits fuel to enter and exit the fuel interface module without passing through any fittings other than the fuel storage fitting and the fuel delivery fitting, and the configuration of the fuel interface module permits fuel to move through the fuel interface module between fuel storage fitting and the fuel delivery fitting via the fuel channel such that movement of the fuel is obstructed in the fuel channel only by the coalescing filter assembly.

26. The fuel interface module of claim 25, wherein, when the fuel interface module is in use to provide fluid communication from the fuel tank to the pressure regulator, the configuration of the fuel interface module permits gaseous fuel to enter the fuel interface module via the fuel storage fitting, then to travel through the body via the fuel channel without leaving the fuel channel other than passing through the coalescing filter assembly, and then to exit the fuel interface module via the fuel delivery fitting.

27. The fuel interface module of claim 25, wherein the fuel interface module is configured to permit gaseous fuel to flow within the fuel channel, without passing through any fittings, between or among a plurality of fuel controlling or analyzing components including the check valve, the shutoff valve, and the coalescing filter assembly.

28. The fuel interface module of claim 25, wherein the filter port and the coalescing filter assembly are spaced from the fuel storage port such that after fuel enters the body via the fuel storage fitting, the fuel passes through the shutoff valve prior to passing through the coalescing filter assembly.

29. The fuel interface module of claim 25, wherein the fuel channel comprises a longitudinal section between a first end of the body and a second end of the body, wherein the fuel channel comprises branches extending from the longitudinal section.

30. The fuel interface module of claim 29, wherein each branch extends through opposing sides of the body and each port is positioned at an end of one of the branches, wherein each port is configured to be coupled with either of a plug and a controlling or analyzing component, and wherein the plug that seals an end of the branch can be moved to an opposite end of the branch such that the fuel interface module is reversible.

* * * * *